US 6,570,093 B2

(12) United States Patent
Doshita et al.

(10) Patent No.: US 6,570,093 B2
(45) Date of Patent: May 27, 2003

(54) HARNESS SLACK ABSORBING APPARATUS

(75) Inventors: Kenichi Doshita, Shizuoka (JP);
Hiroshi Watanabe, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/096,576

(22) Filed: Mar. 14, 2002

(65) Prior Publication Data

US 2002/0129962 A1 Sep. 19, 2002

(30) Foreign Application Priority Data

Mar. 16, 2001 (JP) ........................................ 2001-076515

(51) Int. Cl.$^7$ ................................................ H01B 7/00
(52) U.S. Cl. .................. 174/72 A; 174/135; 174/72 C; 174/48
(58) Field of Search .............................. 174/72 A, 135, 174/48, 68.3, 69, 99 E, 72 C; 361/826

(56) References Cited

U.S. PATENT DOCUMENTS

| | | | | |
|---|---|---|---|---|
| 4,800,648 A | * | 1/1989 | Nakayama et al. | ....... 174/72 A |
| 4,809,561 A | * | 3/1989 | Tsuyama | .................. 74/502.1 |
| 5,367,126 A | * | 11/1994 | Kikuchi | ...................... 174/135 |
| 5,595,494 A | * | 1/1997 | Wiebe | .......................... 174/48 |
| 5,879,047 A | | 3/1999 | Yamaguchi et al. | ..... 296/146.7 |
| 5,921,782 A | * | 7/1999 | Yamaguchi et al. | ...... 174/72 A |
| 5,962,814 A | | 10/1999 | Skipworth et al. | .......... 174/135 |
| 6,199,322 B1 | * | 3/2001 | Itami et al. | ................ 192/12 B |
| 6,257,898 B1 | * | 7/2001 | Serizawa et al. | ........... 174/135 |
| 2001/0052203 A1 | | 12/2001 | Doshita et al. | ................ 49/502 |
| 2002/0014348 A1 | | 2/2002 | Aoki et al. | ................ 174/72 A |

FOREIGN PATENT DOCUMENTS

| | | |
|---|---|---|
| FR | 2 616 390 | 12/1988 |
| JP | 08085399 A1 | * 4/1996 |
| JP | 409259647 A1 | * 10/1997 |
| JP | 2000058170 A1 | * 2/2000 |

OTHER PUBLICATIONS

US patent application Publication No. US 2001/0004022, Jun. 21, 2001, Kobayashi.*

* cited by examiner

*Primary Examiner*—Dean A. Reichard
*Assistant Examiner*—Jinhee J Lee
(74) *Attorney, Agent, or Firm*—Armstrong, Westerman & Hattori

(57) ABSTRACT

A harness slack absorbing apparatus includes a resilient member 6, a harness support member 7 attached to a distal end portion of the resilient member, and a wire harness 4 supported by the harness support member and pushed upward by resilience of the resilient member thereby to absorb a slack of the wire harness. The harness support member 7 includes a recess 8 having a curved shape in cross section, in which the wire harness is held. The harness support member 7 may be provided at its distal end with a curved or inclined face 39 which is continued from the recess in a shape along a bending direction of the wire harness. The recess may have a depth at least larger than a radius of the wire harness. The harness support member may be composed of a support member body and a lid respectively having recesses adapted to be joined together to form a harness insertion bore, so that the wire harness can be held by the member body and the lid along an entire circumference thereof. The harness support member 7 includes an insertion slit for the resilient member 6 and locking means.

11 Claims, 6 Drawing Sheets

HARNESS SLACK ABSORBING APPARATUS

BACKGROUND OF THE INVENTION

1. Field of the Invention

The present invention relates to a harness slack absorbing apparatus to be employed in a sliding door of an automobile or the like, and more particularly to an apparatus for absorbing a slack of a wire harness due to opening and closing movements of the sliding door, by means of a resilient member, in order to attain continuous supply of electric power from a vehicle body to the sliding door, wherein the wire harness is supported by a harness support member attached to a distal end portion of the resilient member.

2. Description of the Related Art

There are disposed in a sliding door of a one boxed car, for example, various functional components for electrical equipment and auxiliary equipment, such as a power window motor, a switch unit for actuating the motor, a window monitor sensor, etc.

In order to supply electric currents of power or signal to these functional components, a wire harness is installed from a vehicle body side (from a battery) to the sliding door and connected to the functional components. The supply of the power must be conducted at any time irrespective of opening and closing movements of the sliding door.

However, in order to continuously charge the wire harness with electric power, opening and closing strokes of the sliding door must be absorbed by expanding and contracting the door side wire harness along with the opening and closing movements of the sliding door. For this purpose, various additional components for absorbing a slack of the wire harness, such as guide rails, sliders, arm members have been required. As the results, there have been problems such as an increase of the components in number, a complicated structure, high cost, a large size and an increase in weight of the sliding door.

Unless such a slack absorbing apparatus is employed, the wire harness will be slackened when the sliding door is opened or closed, and caught between the sliding door and the vehicle body, or the wire harness may vibrate with vibration of the vehicle while driving and interfere with other components, causing strange noises or damages.

There also have been such a problem that a number of steps are required in fixing the wire harness to arm members by a band or tape winding, resulting in inferior assembling workability, and such an anxiety that when the wire harness happens to be loosened or disengaged from the arm members during use, the wire harness may be caught between the sliding door and the vehicle body and broken, or strange noises or damages may occur due to an interference between the wire harness and the arm members.

In view of the above described circumstances, the object of the present invention is to provide a harness slack absorbing apparatus which is simple in structure, not only reliably absorbs a slack of a wire harness but also enhances assembling workability of the wire harness as well as the apparatus itself, and further, can reliably prevent strange noises and damages due to disengagement and interference of the wire harness.

SUMMARY OF THE INVENTION

In order to attain the above described object, according to a first aspect of the present invention, there is provided a harness slack absorbing apparatus comprising a resilient member, a harness support member attached to a distal end portion of the resilient member, and a wire harness supported by the harness support member and pushed upward by resilience of the resilient member thereby to absorb a slack of the wire harness, wherein the harness support member includes a recess in which the wire harness is held.

According to a second aspect of the present invention, the recess has a curved shape in cross section.

According to a third aspect of the present invention, the harness support member is provided at its distal end with a curved or inclined face which is continued from the recess in a shape along a bending direction of the wire harness.

According to a fourth aspect of the present invention, the recess of the harness support member has a depth at least larger than a radius of the wire harness.

According to a fifth aspect of the present invention, guide faces for introducing the wire harness are formed at upper edges of the recess.

According to a sixth aspect of the present invention, the harness support member includes a support member body and a lid respectively having recesses, the recesses being joined together to form a harness insertion bore, whereby the wire harness is held by the support member body and the lid along an entire circumference thereof.

According to a seventh aspect of the present invention, the support member body and the lid are locked by locking means.

According to an eighth aspect of the present invention, the support member body and the lid are connected by a hinge so as to be opened and closed.

According to a ninth aspect of the present invention, the harness support member includes an insertion slit for receiving the resilient member, and locking means for locking the resilient member inside the insertion slit.

The present invention also relates to a harness slack absorbing apparatus comprising a resilient member, a harness support member attached to a distal end portion of the resilient member, and a wire harness supported by the harness support member and pushed upward by resilience of the resilient member thereby to absorb a slack of the wire harness, wherein the harness support member is provided at its distal end with a curved or inclined face in a shape along a bending direction of the wire harness.

The present invention further relates to a harness slack absorbing apparatus comprising a resilient member, a harness support member attached to a distal end portion of the resilient member, and a wire harness supported by the harness support member and pushed upward by resilience of the resilient member thereby to absorb a slack of the wire harness, wherein the harness support member includes an insertion slit for receiving the resilient member, and locking means for locking the resilient member inside the insertion slit.

According to the first aspect, the wire harness can be stably supported by the recess of the harness support member, at the distal end portion of the resilient member. Accordingly, a work for setting the wire harness to the harness support member can be facilitated, and the wire harness can be accurately positioned, thus enhancing assembling workability. It is also apparent that a slack of the wire harness can be reliably absorbed by a simple structure including the resilient member and the harness support member.

According to the second aspect, by abutting an outer circumference of the wire harness having a round or oval shape in cross section against the curved face of the recess, the wire harness can be supported in a more stable manner, and fall of the wire harness from the harness support member can be prevented.

According to the third aspect, because the wire harness will be slid and curved smoothly along the curved face or the inclined face, a catch of the wire harness with the distal end of the harness support member will be prevented. This will enable a slack absorption of the wire harness by the resilient member to be smoothly performed, and bending, breakage of the wire harness, occurrence of strange noises and so on will be prevented.

According to the fourth aspect, since the wire harness is deeply engaged in the recess, the wire harness will be stably retained without falling from the harness support member in a lateral direction. Accordingly, there will be no need of fixing the wire harness to the resilient member, thus facilitating assembling work of the wire harness.

According to the fifth aspect, the wire harness can be easily and reliably inserted into the harness support member along the guide faces, and the assembling workability will be enhanced.

According to the sixth aspect, because the wire harness can be retained along the entire circumference by the support member body and the lid, fall of the wire harness from the harness support member due to vibration of the vehicle during driving or violent opening and closing movements of the sliding door can be reliably prevented. Accordingly, a slack absorption of the wire harness can be always accurately performed and a catch of the wire harness between the sliding door and the vehicle body can be prevented. Moreover, there will be no need of fixing the wire harness to the resilient member, thus enhancing the assembling workability of the wire harness.

According to the seventh aspect, fixation of the support member body and the lid can be easily made by the locking means, thus enhancing the assembling workability.

According to the eighth aspect, the lid can be easily opened or closed with respect to the support member body by a single action. Therefore, the assembling workability and maintenance ability can be improved.

According to the ninth aspect, the harness support member can be fixed to the resilient member by a single action by means of the locking means, and the assembling workability will be enhanced.

DESCRIPTION OF THE PREFERRED EMBODIMENTS

Now, several embodiments of the present invention will be described in detail referring to the attached drawings.

Figure 1:
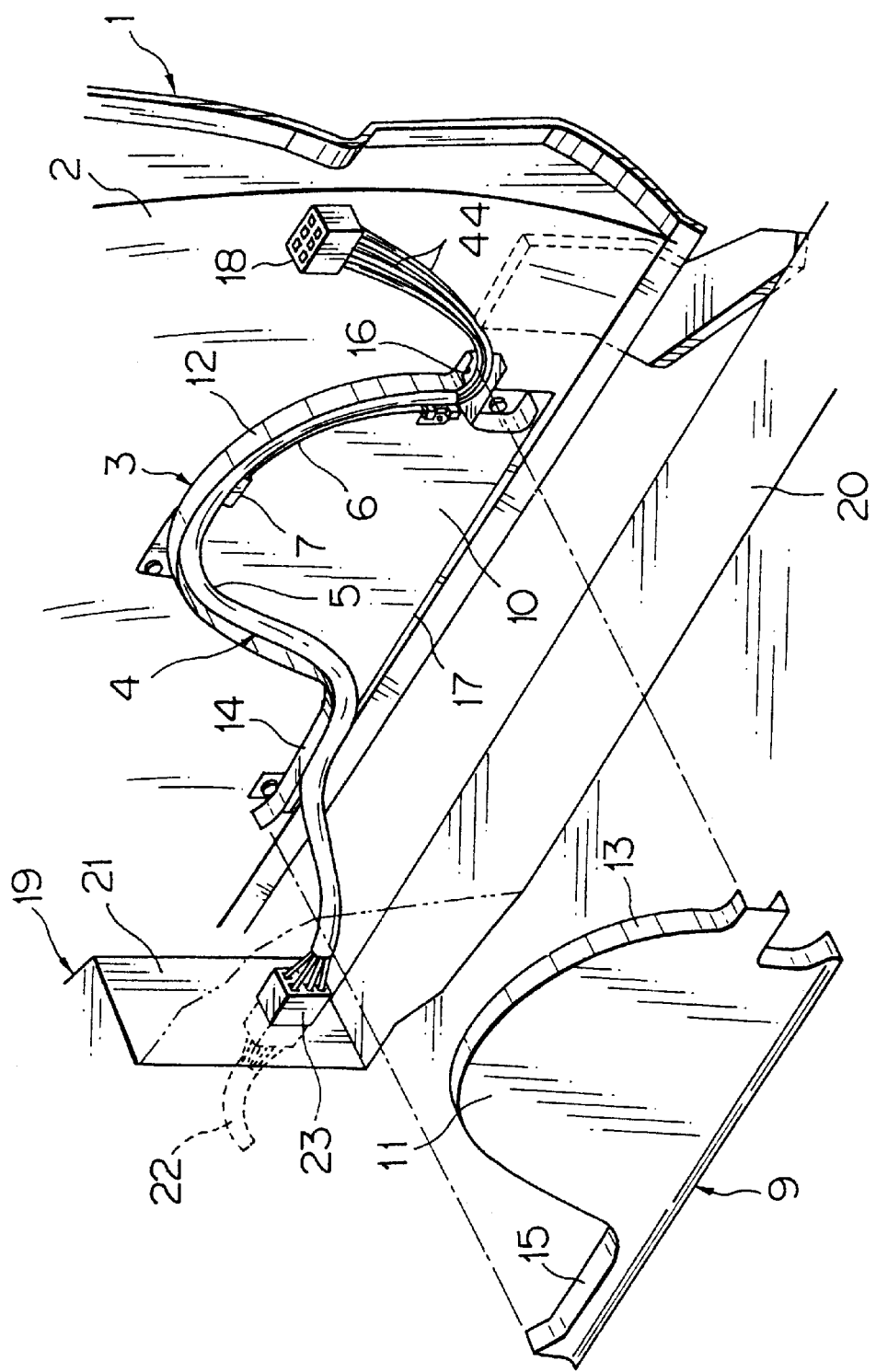
FIG. 1 is an exploded perspective view showing a harness slack absorbing apparatus according to the present invention in a state installed in a sliding door.
Figure 2:
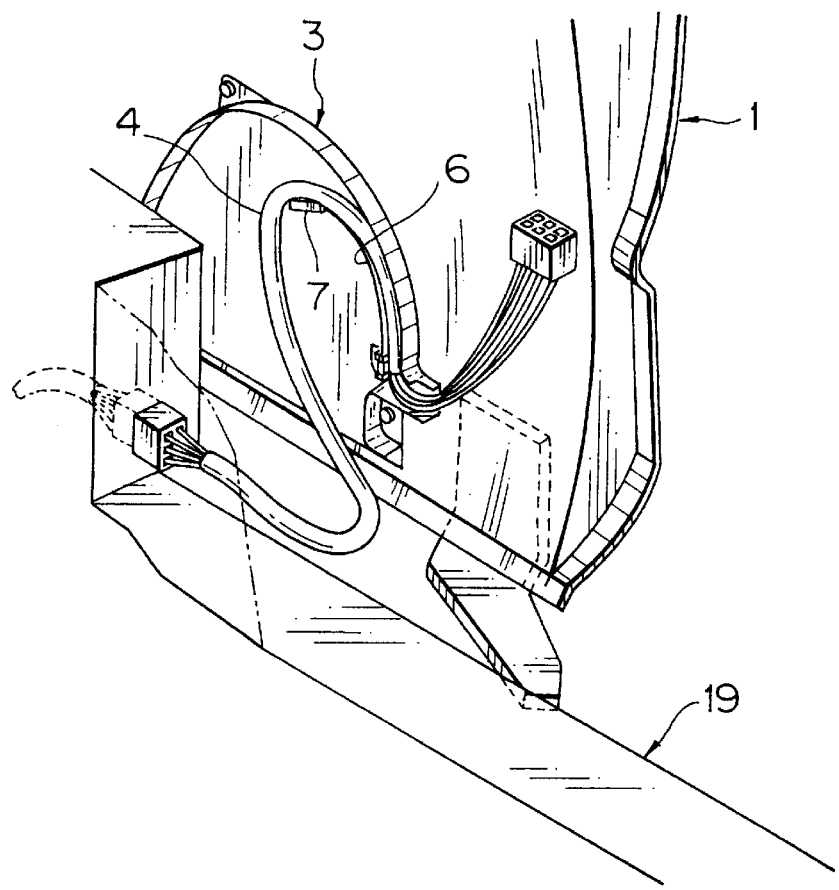
FIG. 2 is a perspective view of the harness slack absorbing apparatus while the sliding door is being opened.

FIGS. 1 and 2 show an entire structure of a harness slack absorbing apparatus according to the present invention which is installed in a sliding door of a motor vehicle. FIG. 1 shows the apparatus in a closed position of the sliding door, and FIG. 2 shows the apparatus in a state where the sliding door is being opened.

In FIG. 1, an inner panel 2 of a sliding door 1 is provided with a protector 3 including a protector body made of synthetic resin, a wire harness 4 installed in a curved state inside the protector 3, a resilient member in a form of a leaf spring 6 disposed along a lower face of a curved part 5 of the wire harness 4, and a harness support member 7, which is an essential part of the present invention, positioned at a distal end portion of the leaf spring 6. The wire harness 4 is stably supported along a groove or recess 8 in a curved shape or in an arc-like shape in cross section (See FIGS. 3 and 4) of the harness support member 7.

As shown in FIG. 1, the protector 3 is composed of a protector body (also denoted with reference numeral 3) and a cover 9. The protector body 3 and the cover 9 respectively have vertical base plates 10, 11, surrounding walls 12, 13 uprightly provided from the base plates, and backwardly extending walls 14, 15. There are formed a narrow first harness guide outlet 16 at a forward end, and a wide second harness guide outlet 17 under the base plate 10. The protector body 3 is fixed to the inner panel 2 by means of bolts or the like, and the cover 9 is locked to the protector body 3 by locking means (not shown).

The wire harness 4 is pushed upward by the leaf spring 6 inside the protector body 3 so that a slack can be absorbed. The leaf spring 6 is fixed at its base end to the protector body 3, and extended in a curved shape along the wire harness 4. The harness support member 7 is positioned near a top of the curved part 5 of the wire harness 4.

One end of the wire harness 4 is guided out of the harness guide outlet 16 at the forward end toward the inner panel 2, and electrically connected to functional components (not shown) in the sliding door 1. The other end of the wire harness 4 is extended toward a vehicle body 19 through the underlying harness guide outlet 17, then fixed to a back end wall 21 of a step 20, and at the same time, connected to a wire harness 22 in the vehicle body (a power supply side) by means of a connector 23.

In a fully closed state of the sliding door 1 as shown in FIG. 1, the wire harness 4 is pulled backward and pushed by the leaf spring 6 upward into a curved shape having a large curvature, inside the protector 3. As the sliding door 1 is opened by sliding it backward, the wire harness 4 is pulled forward reducing its diameter in a fully opened state. The leaf spring 6 pushes the wire harness 4 upward to prevent a slack of the wire harness. On occasion of contraction and expansion, the wire harness 4 can smoothly slide along a recess 8 (See FIG. 3) provided on an upper face of the harness support member 7 which is fixed to a distal end portion of the leaf spring 6. This enables the wire harness 4 and the leaf spring 6 to be smoothly curved with a slight friction.

It is also possible to dispose the protector 3 and the leaf spring 6 on the vehicle body 19 so that a slack of the wire harness 4 can be absorbed on a side of the vehicle body 19.

Figure 3:
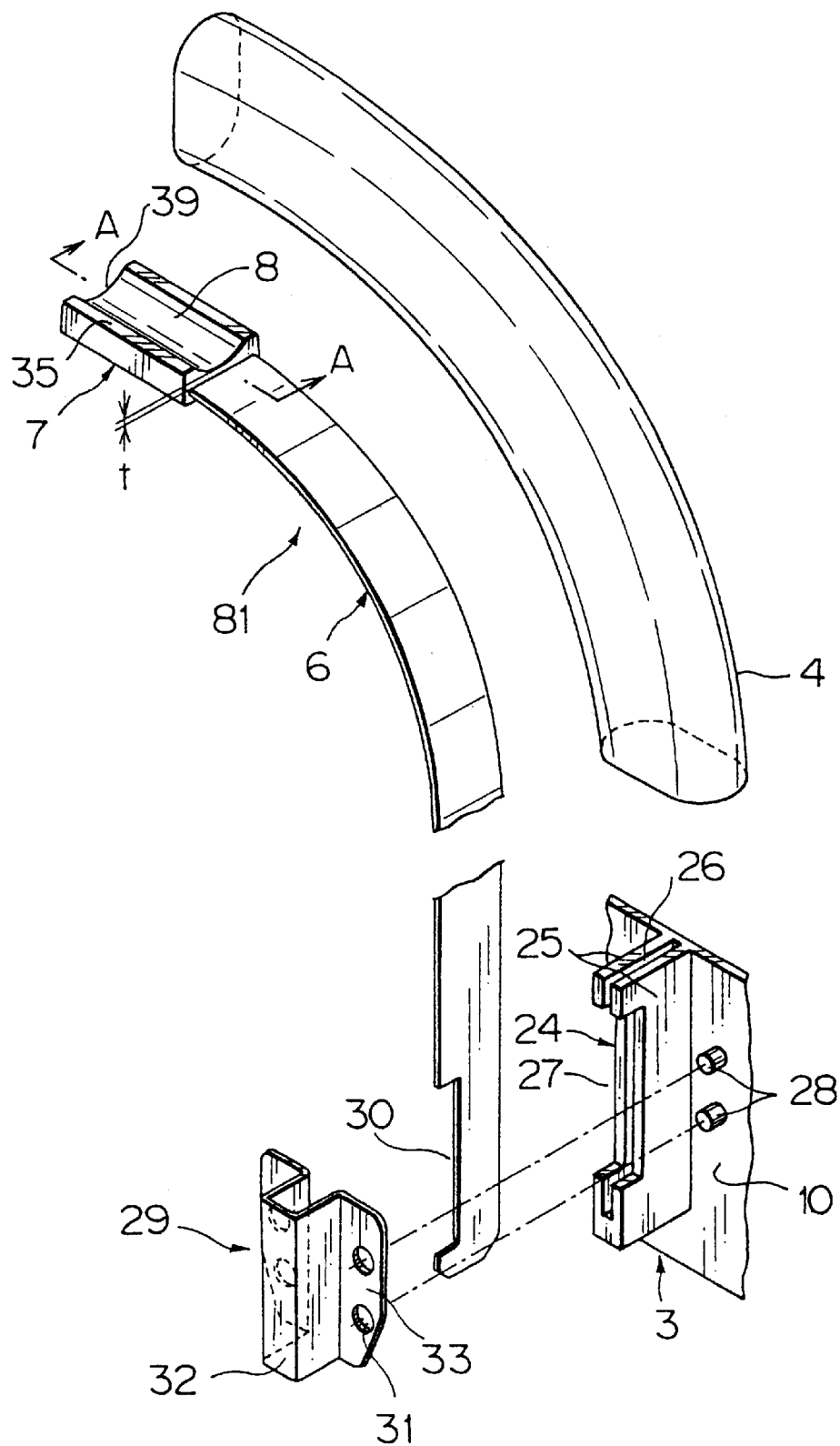
FIG. 3 is an exploded perspective view showing a first embodiment of the harness slack absorbing apparatus according to the present invention.
Figure 4:
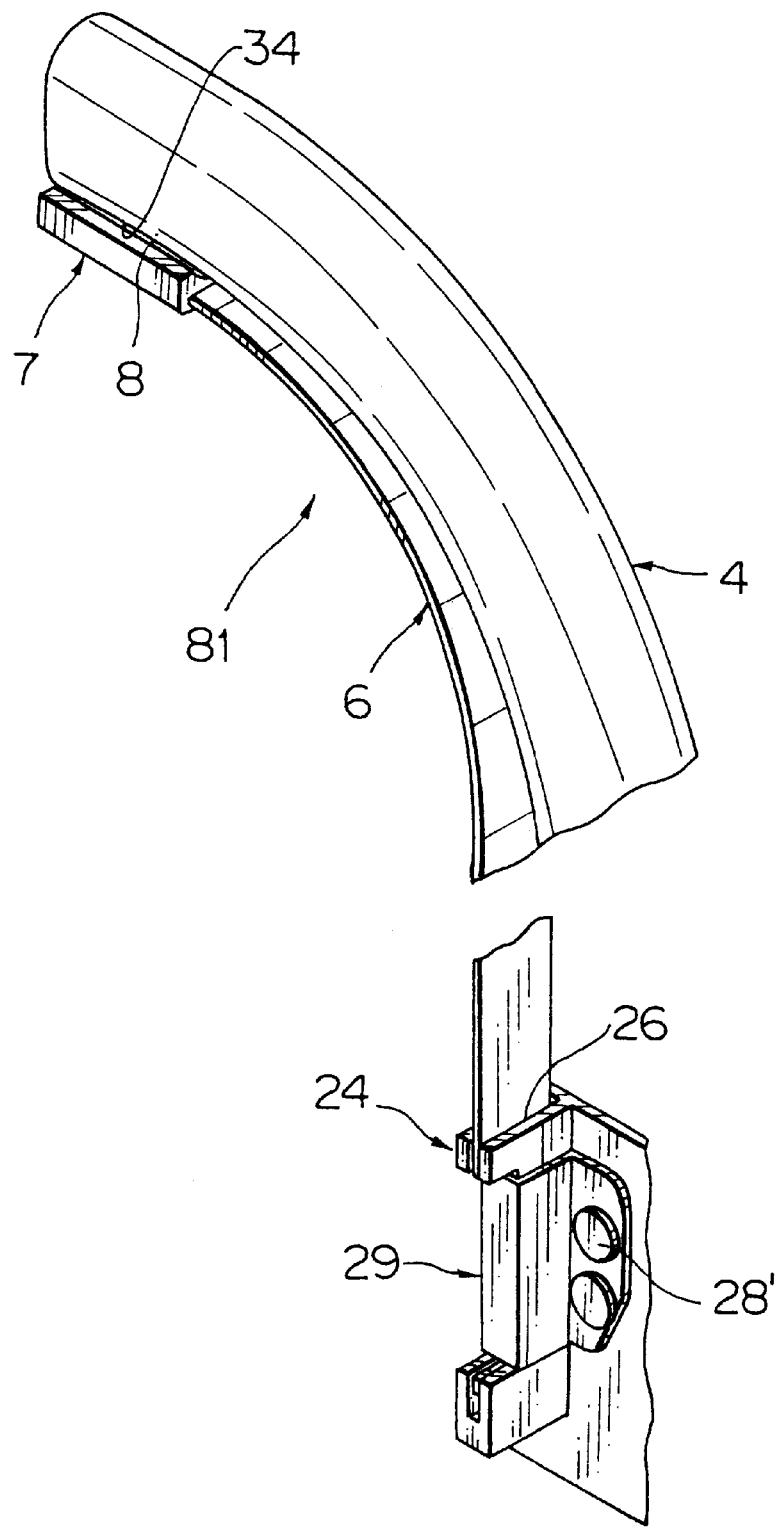
FIG. 4 is a perspective view of the harness slack absorbing apparatus of FIG. 3 in an assembled state.

FIGS. 3 and 4 show a first embodiment of the above described harness slack absorbing apparatus. As apparent from FIG. 3, a base end portion of the leaf spring 6 in this harness slack absorbing apparatus 81 is fixed to an insertion part 24 which is projected integrally from the base plate 10 of the protector body 3. To the distal end portion of the leaf spring 6, is fixed the above mentioned harness support member 7 provided with the recess 8 in a longitudinal direction. The leaf spring 6 may be made of metallic material, glass fiber or the like.

The insertion part 24 has a pair of vertical walls 25 and an insertion groove 26 in a form of a slit formed between the walls 25. The walls 25 respectively have cut-outs 27 in a rectangular shape at an intermediate position in a vertical direction. On the base plate 10 made of synthetic resin, there are integrally formed projections 28 for engagement with a fixing member 29, at both sides of the insertion part 24.

The leaf spring 6 also has a cut-out 30 similar to the cut-outs 27 in the insertion part 24. When the fixing member 29 made of metal is engaged with both the cut-outs 27 and 30 (FIG. 3) in a state where the base end portion of the leaf spring 6 has been received in the insertion groove 26, and the projections 28 are inserted into holes 31 on both sides of the fixing member 29 to be thermally compressed at 28' as shown in FIG. 4, the leaf spring 6 can be rigidly fixed to the insertion part 24.

Referring to FIG. 3, the fixing member 29 is composed of a central wall 32 in a U-shape in cross section adapted to be engaged with the cut-outs 27, 30, and base plate portions 33 on both sides of the central wall 32. The base plate portions 33 have fixing holes 31. Fixation of the fixing member 29 may be made either by welding or screw fitting. Such structures for fixing the leaf spring 6 have been proposed in detail in a separate application. Means for fixing the leaf spring 6 are not limited to the above described structure.

The wire harness 4 is installed along an upper face of the leaf spring 6 as shown in FIG. 4, and at the same time, a curved face 34 in a lower part of the wire harness 4 is received in the curved recess 8 of the harness support member 7 so as to stabilize the wire harness 4 in a lateral direction. Although the wire harness 4 is illustrated broken at halfway in a longitudinal direction in FIG. 4, it is a fact that the wire harness 4 is extended backward from the harness support member 7, as shown in FIG. 1.

The harness support member 7 is formed of synthetic resin into a shape of rectangular block or a box-like shape, and provided with the curved recess 8 in an arc-like shape, as described above, for supporting the wire harness 4 on its upper face. The recess 8 extends in a longitudinal direction of the wire harness 4 and the leaf spring 6, and is curved downward or in a direction of its thickness when the harness support member 7 is viewed from a distal end or a base end thereof. A center of curvature of the curved recess 8 is positioned above the harness support member 7. Narrow banks 35 are formed on both sides of the curved recess 8 so as to project upward. A radius of the curvature of the curved recess 8 is preferably equal to or slightly larger than a radius of the wire harness. It is preferable from a viewpoint of tightness between the wire harness 4 and the leaf spring 6 that thickness t between the deepest point of the recess 8 and an upper face of the leaf spring 6 is as small as possible.

Figure 5:
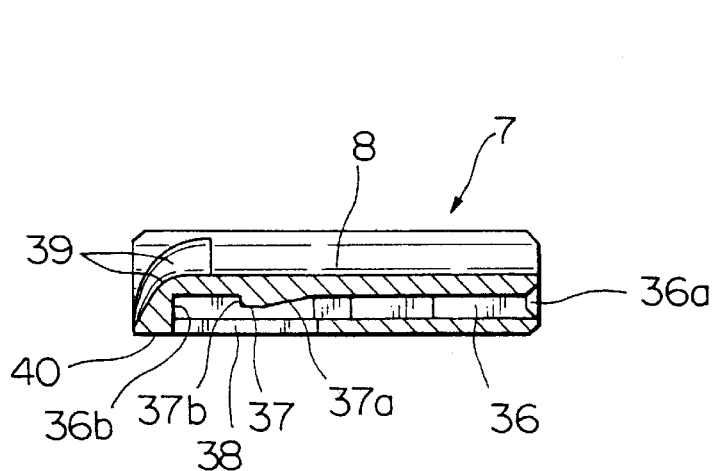
FIG. 5 is a sectional view showing a harness support member taken along a line A—A of FIG. 3.

As shown in FIG. 5 which is a sectional view taken along a line A—A of FIG. 3, there are provided, inside the harness support member 7, an insertion slit 36 into which the distal end portion of the leaf spring 6 is inserted and fixed, and a locking projection 37. A distal end portion of the insertion slit 36 communicates with an opening 38 provided on a lower face, and the locking projection 37 is located inside the opening 38. The insertion slit 36 extends short of a second curved face 39 at a distal end of the harness support member 7, and the distal end portion of the leaf spring 6 can be abutted against a terminal end 36b of the insertion slit 36. The second curved face 39 will be described below.

When the distal end portion of the leaf spring 6 has entered into the insertion slit 36, the distal end portion of the leaf spring 6 is flexed downward inside the opening 38 and rides over the locking projection 37 so that the locking projection 37 may be engaged with a locking hole (not shown) of the leaf spring 6 when it has been restored. In this manner, the harness support member 7 can be easily fixed to the leaf spring 6 with a single action and will be never withdrawn.

The insertion slit 36 may be, for example, composed of a wide part in a center having a wide space in a direction of thickness, and narrow parts in a form of a slit on both sides having narrow spaces in the direction of thickness. In this case, the locking projection 37 may be provided in the wide part. The locking projection 37 may be either in a rectangular shape, a short columnar shape or a trigonal shape. The locking projection 37 includes an inclined guide face 37a opposed to an inlet 36a of the insertion slit 36, that is, the base end of the harness support member 7, and a vertical locking face 37b opposed to the distal end portion of the insertion slit 36. The insertion slit 36 may have a larger width near the inlet 36a and a smaller width in the distal end portion. In case where the locking projection 37 in a short columnar shape is employed, by engaging the locking projection 37 with a round hole (not shown) in the distal end portion of the leaf spring 6, the harness support member 7 can swing to some extent in a lateral direction in correspondence with bending movement of the wire harness 4.

Then, by mounting the wire harness 4 in a round or oval shape in cross section on the recess 8 of the harness support member 7 in an arc-like shape in cross section as shown in FIG. 4, the wire harness 4 can be supported in a stable manner without being laterally displaced or detached. Because the wire harness 4 is stably supported at the distal end portion of the leaf spring 6, it will be at least unnecessary to fix the distal end portion of the leaf spring 6 to the wire harness 4 by tape winding or the like. In case where the wire harness 4 is laterally supported between the protector body 3 and the cover 9 (FIG. 1), it will be unnecessary at all to fix the wire harness 4 by tape winding or the like. The wire harness 4 can be easily and reliably installed along the resilient member 6 which is in a form of a flat plate in a lateral direction, by placing the wire harness on the recess 8.

Referring also to FIG. 5, at the distal end portion of the harness support member 7, the recess 8 is curved downward in an arc-like shape to form the second curved face 39 which continues smoothly up to a bottom face 40 of the harness support member 7. When the harness support member 7 is viewed from a lateral direction, the curved face 39 is curved downward in a forward direction, and a center of the curvature of the curved face 39 is positioned below the harness support member 7. This curved face 39 will reliably prevent the wire harness 4 from being caught or bent.

Unless the curved face 39 is provided, there would be such fears that when the wire harness 4 is violently pulled downward with the opening and closing movements of the sliding door (FIG. 1), the wire harness 4 may be bent downward in an L-shape at the distal end of the harness support member 7 making it as a fulcrum, or when the wire harness 4 is being restored into an upward curved shape, a distal edge of the harness support member 7 may be caught in one of grooves 42 of a corrugated tube 41 (FIG. 6), which is a protective tube for the wire harness, to cause bending, damage, wear or strange noise of the corrugated tube 41. The situation will be the same when the harness support member 7 is not employed.

By providing the second curved face 39, there will be no fear of deformation or damage of the wire harness even when the wire harness 4 is violently pulled, because the wire harness 4 is smoothly curved in an arc-like shape along the curved face 39 and prevented from being bent in an L-shape. The case is the same even when the corrugated tube 41 is not employed. Damage, wear or occurrence of strange noises of the corrugated tube 41 will be also prevented, because the distal end edge of the harness support member 7 will not be caught in the groove 42 of the corrugated tube 41.

Figure 6:
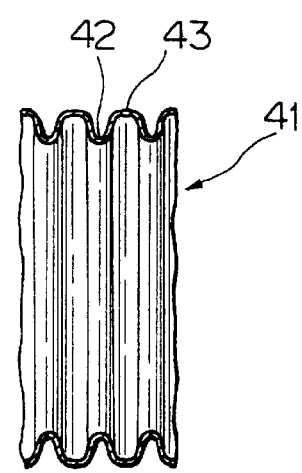
FIG. 6 is a cross sectional view of a corrugated tube of a wire harness.

As shown in cross section in FIG. 6, the corrugated tube 41 has a favorable flexibility having the dented grooves 42 and projected ribs 43 alternately arranged in a longitudinal direction. A plurality of electric wires 44 (FIG. 1) are passed through the corrugated tube 41 to constitute the wire harness 4. The corrugated tube 41 is one component of the wire harness 4.

Although the corrugated tube as seen in FIG. 3 (denoted also by reference numeral 4) is oval shaped in cross section, the corrugated tube which is round in cross section can be also employed. It is also possible to employ a braided tube instead of the corrugated tube 41 as the harness protective tube. The harness protective tube will eliminate deterioration in flexibility which would be caused by bundling a plurality of electric wires 33 with a vinyl tape, and will protect the electric wires 44 from an interference from the outside.

It is also advantageous to provide the second curved face 39 at a distal end portion of a harness support member in a rectangular shape without the recess 8 (not shown). It is also possible to form a groove or recess in a rectangular shape or in a substantially V-shape (not shown) in place of the curved recess 8. It is also advantageous to provide an inclined face having a tapered shape in place of the curved face 39.

Figure 7:
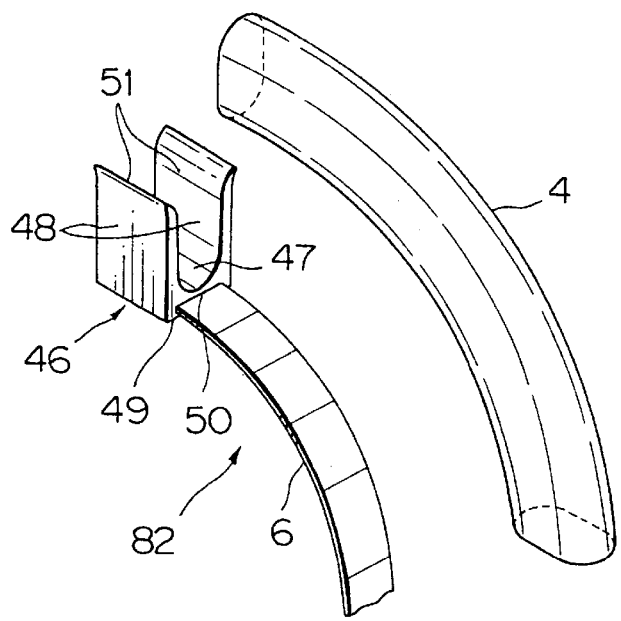
FIG. 7 is an exploded perspective view showing a second embodiment of the harness slack absorbing apparatus according to the present invention.
Figure 8:
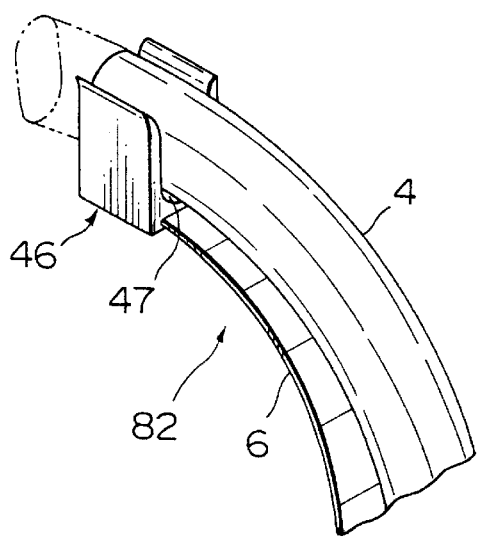
FIG. 8 is a perspective view of the harness slack absorbing apparatus of FIG. 7 in an assembled state.

FIGS. 7 and 8 show a second embodiment of the harness slack absorbing apparatus according to the present invention.

Characteristic feature of this harness slack absorbing apparatus 82 is that the groove or recess 47 of the harness support member 46 to be fixed to the distal end portion of the leaf spring 6 is formed deep so that the wire harness 4 can be completely held in a lateral direction.

A depth of the recess 47 is substantially equal to a larger outer diameter of the corrugated tube (denoted also by reference numeral 4) having an oval shape in cross section. In case of employing the corrugated tube having a round shape in cross section, the depth of the recess 47 is substantially equal to the outer diameter of the corrugated tube. An inner width of the recess 47 is formed slightly larger than a width of the corrugated tube, so that the corrugated tube can smoothly slide inside the recess 47. The recess 47 is defined by vertical side walls 48 and a horizontal base wall 49. A height of the side walls 48 is substantially equal to a height of the wire harness 4. It is necessary for preventing fall of the wire harness 4 that the height of the side walls 48 is at least larger than a half of the outer diameter of the wire harness 4. At one end of the horizontal wall 49, is provided an insertion slit 50 for receiving the leaf spring in the same manner as in the first embodiment. There is also provided the locking projection 37 (FIG. 5) in the insertion slit 50.

Upper ends of the side walls 48 are open outwardly in a curved shape to form guide faces 51. The wire harness 4 can be smoothly inserted into the recess 47 from the above along the curved guide faces 51. Outer faces of the side walls 48 may be made flat, and the guide faces 51 may be formed on the inner faces of the side walls 48. The guide faces 51 are not necessarily curved, but may be inclined or tapered.

When the wire harness 4 is pulled with opening and closing movements of the sliding door 1, the wire harness 4 slides smoothly along the recess 47 while the leaf spring 6 is flexed, and a positional displacement of the wire harness 4 with respect to the harness support member 46 which is attributed to a difference in bending radius of the leaf spring 6 and the wire harness 4 will be absorbed.

By providing the second curved face (not shown) at the distal end portion of the recess 47 in the same manner as in the embodiment of FIG. 3, a catch of the corrugated tube with the harness support member 46 will be prevented, and more smooth sliding movement of the wire harness 4 can be attained. Accordingly, the wire harness 4 will be prevented from being acutely bent downward in an L-shape. The second curved faces are continuously formed on a distal end of the base wall 49 and distal ends of at least lower halves of the side walls 48. In place of the second curved faces, inclined faces in a tapered shape may be employed. It is also possible to form the bottom part of the recess 47 in a rectangular shape instead of the curved shape.

According to the second embodiment as shown in FIGS. 7 and 8, the wire harness 4 can be completely retained by both the side walls 48 of the harness support member 46 in a lateral direction, and fall of the wire harness 4 in a lateral direction can be prevented. Accordingly, this will eliminate necessity of fixing the wire harness 4 to the leaf spring 6 by means of a vinyl tape, band or the like, and assembling work will be simplified.

Figure 9:
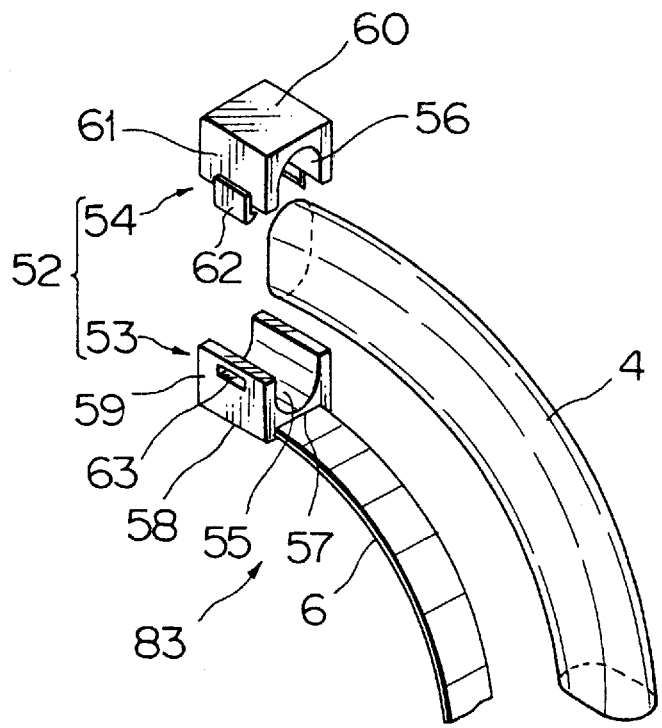
FIG. 9 is an exploded perspective view showing a third embodiment of the harness slack absorbing apparatus according to the present invention.

FIG. 9 shows a third embodiment of the harness slack absorbing apparatus.

Characteristic feature of this harness slack absorbing apparatus 83 is that a harness support member 52 to be fixed to the distal end portion of the leaf spring 6 is formed in a substantially frame-like shape which can be divided vertically, and the wire harness 4 can be completely held along an entire circumference thereof.

The harness support member 52 is composed of a support member body 53 in a lower part made of synthetic resin to be fixed to the leaf spring 6, and a lid 54 made of synthetic resin to be locked with the support member body 53 by means of locking means. The support member body 53 and the lid 54 are respectively provided with recesses 55, 56 having a semi-elliptical shape in cross section, so that the corrugated tube (denoted also by reference numeral 4) having an elliptical shape in cross section can be held in the recesses 55, 56 so as to freely move in a longitudinal direction. Inner diameters of the recesses 55, 56 are set slightly larger than the outer diameter of the corrugated tube.

When the upper and the lower recesses 55, 56 are joined together, there is formed a harness insertion bore having an elliptical shape. In case of the corrugated tube having a round shape, the support member body and the lid respectively having semi-circular recesses may be employed, so that the recesses may be joined to form a round harness insertion bore.

The support member body 53 has a base wall 58 having a leaf spring insertion slit 57 as in the above described embodiments, and side walls 59 uprightly provided on both sides of the base wall 58. There is formed the recess 55 surrounded by the walls 58, 59. The lid 54 has a top wall 60 and side walls 61, and there is formed the recess 56 surrounded by the walls 60, 61.

As means for locking, flexible locking claws 62, for example, may be provided on lower parts of the side walls 61 of the lid 54, and locking grooves 63 for engagement with the locking claws 62 may be formed on the side walls 59 of the support member body 53. The locking means are not necessarily in such a form, but either form can be employed. For example, the locking claws are provided on the lower end faces of the side walls 61, while the locking grooves are provided on the upper end faces of the side walls 59, or alternatively, the locking claws are provided on the support member body 53, while the locking grooves are provided on the lid 54. It is also possible to provide locking frame pieces (not shown) in place of the locking claws, and locking projections (not shown) in place of the locking grooves.

It is also possible to form a second curved face (not shown) continued from the recess 55 at the distal end portion of the support member body 53. There may be also formed the second curved face (not shown) at the distal end portion of the lid 54 to cooperate with the second curved face of the support member body 53 to form an annular curved face at an inlet of the harness insertion bore. By providing the second curved faces, a catch of the wire harness 4 will be prevented, and more smooth sliding movement of the wire harness 4 and smooth bending of the wire harness 4 as well as the leaf spring 6 can be attained. It is also advantageous to form inclined faces in a tapered shape instead of the second curved faces.

Figure 10:
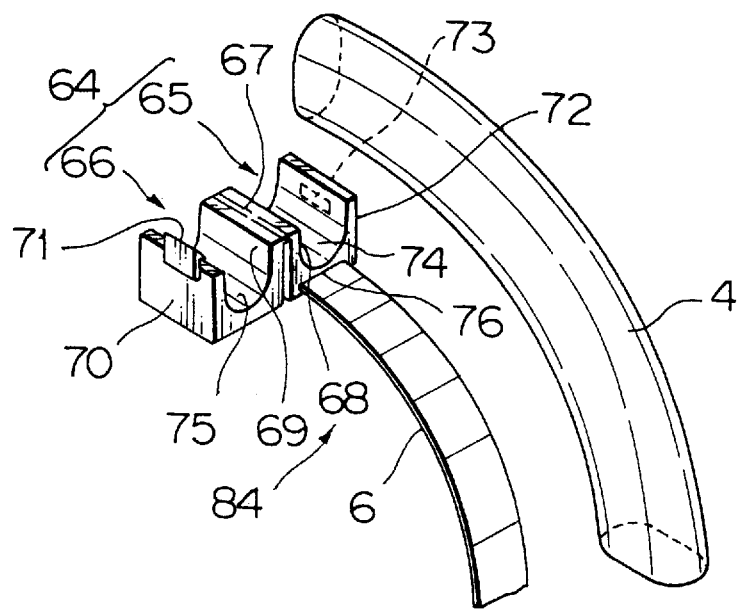
FIG. 10 is an exploded perspective view showing a fourth embodiment of the harness slack absorbing apparatus according to the present invention.

FIG. 10 shows a harness slack absorbing apparatus 84 according to a still further embodiment. Characteristic feature of this embodiment is that a support member body 65 and a lid 66 of a harness support member 64 are coupled by means of a hinge 67 so as to be opened and closed.

One of side walls 68 of the support member body 65 and one of side walls 69 of the lid 66 are joined integrally at their edges by means of the hinge 67. The other side wall 70 of the lid 66 is provided with a locking claw 71, and the other side wall 72 of the support member body 65 is provided with a locking groove 73 for engagement with the locking claw 71. Various locking means in the above described forms can be appropriately employed. Forms of a recess 74 of the support member body 65 and a recess 75 of the lid 66, forms of the second curved faces (not shown) or inclined faces, and a form of an insertion slit 76 for receiving the leaf spring 6 are substantially the same as in the embodiment of FIG. 9, and so, their explanation will be omitted.

Figure 11:
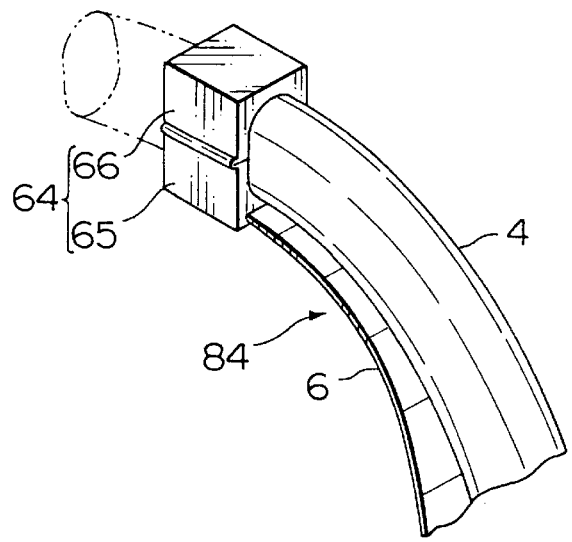
FIG. 11 is a perspective view of the harness slack absorbing apparatus of FIG. 10 in an assembled state.

By engaging the wire harness 4 in the recess 74 of the support member body 65, and then, closing the lid 66, the wire harness 4 is completely held by the harness support member 64 along the entire circumference as shown in FIG. 11, so as to freely slide in a longitudinal direction. The case is the same in the harness support member 52 in FIG. 9.

According to the embodiments of FIGS. 9 and 10, the wire harness 4 is completely retained both in a vertical direction and in a lateral direction. As the results, there will be no fear that the wire harness 4 may be detached from the harness support members 52, 64 due to vibrations while the vehicle is driving. In addition, there will be no need of works for fixing the wire harness 4 to the leaf spring 6, as in the embodiment of FIG. 8.

It is also possible to employ fixing means such as welding, instead of the locking means between the lid 54 and the support member body 53. Moreover, the support member body 53 and the lid 54 may be formed integrally to constitute the harness support member provided with a round or elliptical harness insertion bore. It is also possible to employ a harness support member (not shown) in an annular shape. After the wire harness 4 has been passed through the harness insertion bore, the wire harness 4 can be guided out to the exterior from the harness guide outlets 16, 17 of the protector 3 in FIG. 1, for example.

It is also possible to form projections (not shown) for engagement with the grooves 42 of the corrugated tube 41 (FIG. 6), inside the recesses 55, 56, 74, 75 of the harness support members 52, 64, to retain the corrugated tube 41 so as not to move in a longitudinal direction, but so as to move in a circumferential direction. Further, the leaf spring in various forms can be appropriately employed. For example, in place of the leaf spring 6, a rod-like spring having a round shape or a rectangular shape in cross section, and a spirally coiled leaf spring can be employed.

Although the present invention has been described in detail by way of examples with reference to the accompanying drawings, it is to be noted that various changes and modifications can be made within the scope of the present invention.

What is claimed is:

1. A harness slack absorbing apparatus comprising;
   a resilient member,
   a harness support member attached to a distal end portion of said resilient member, and
   a wire harness supported by said harness support member and pushed upward by resilience of said resilient member thereby to absorb a slack of said wire harness,
   wherein said harness support member includes a recess in which said wire harness is held.

2. The harness slack absorbing apparatus as claimed in claim 1, wherein said recess has a curved shape in cross section.

3. The harness slack absorbing apparatus as claimed in claim 1, wherein said harness support member is provided at its distal end with a curved or inclined face which is continued from said recess in a shape along a bending direction of said wire harness.

4. The harness slack absorbing apparatus as claimed in any one of claims 1 to 3, wherein said recess of said harness support member has a depth at least larger than a radius of said wire harness.

5. The harness slack absorbing apparatus as claimed in claim 4, wherein guide faces for introducing said wire harness are formed at upper edges of said recess.

6. The harness slack absorbing apparatus as claimed in any one of claims 1 to 3, wherein said harness support member includes a support member body and a lid respectively having recesses, said recesses being joined together to form a harness insertion bore, whereby said wire harness is held by said support member body and said lid along an entire circumference thereof.

7. The harness slack absorbing apparatus as claimed in claim 6, wherein said support member body and said lid are locked by locking means.

8. The harness slack absorbing apparatus as claimed in claim 6, wherein said support member body and said lid are connected by a hinge so as to be opened and closed.

9. The harness slack absorbing apparatus as claimed in claim 1, wherein said harness support member includes an insertion slit for receiving said resilient member, and locking means for locking said resilient member inside said insertion slit.

10. A harness slack absorbing apparatus comprising;

a resilient member, a harness support member attached to a distal end portion of said resilient member, and a wire harness supported by said harness support member and pushed upward by resilience of said resilient member thereby to absorb a slack of said wire harness, wherein said harness support member is provided at its distal end with a curved or inclined face in a shape along a bending direction of said wire harness.

11. A harness slack absorbing apparatus comprising;

a resilient member, a harness support member attached to a distal end portion of said resilient member, and a wire harness supported by said harness support member and pushed upward by resilience of said resilient member thereby to absorb a slack of said wire harness, wherein said harness support member includes an insertion slit for receiving said resilient member, and locking means for locking said resilient member inside said insertion slit.

* * * * *